United States Patent [19]

Takeuchi

[11] Patent Number: 4,563,714
[45] Date of Patent: Jan. 7, 1986

[54] METHOD AND DEVICE FOR CONTROLLING THE TRACKING

[75] Inventor: Motohiko Takeuchi, Yokohama, Japan

[73] Assignee: Tokyo Shibaura Denki Kabushiki Kaisha, Kawasaki, Japan

[21] Appl. No.: 591,324

[22] Filed: Mar. 19, 1984

[51] Int. Cl.$^4$ .............................................. G11B 5/56
[52] U.S. Cl. .................................................. 360/77
[58] Field of Search ......................................... 360/77

[56] References Cited

U.S. PATENT DOCUMENTS 4,297,733 10/1981 Sanderson ............................ 360/77

FOREIGN PATENT DOCUMENTS 0092289 10/1983 European Pat. Off. .
0094194 11/1983 European Pat. Off. .

*Primary Examiner*—George G. Stellar
*Attorney, Agent, or Firm*—Cushman, Darby & Cushman

[57] ABSTRACT

In a method and device for controlling the tracking in a playback mode in accordance with at least four pilot signals of different frequencies f1, f2, f3 and f4 which are sequentially recorded together with information signals on tracks of a recording medium in a predetermined cyclic sequence and which satisfy a relationship $|f1-f2|:|f2-f3|:|f3-f4| = A:B:A$, an extraction section extracts pilot signal components from reproduced signals obtained by playing back the recording medium. A reference signal supplying section supplies four reference signals which have the same relationship those of the four pilot signal frequencies f1, f2, f3 and f4 and a different cyclic sequence from that of the four pilot signals. A comparing and detecting section compares the extracted pilot signal components with the corresponding reference signals and detects differences between the two pilot signal components extracted from the right and left tracks adjacent to the reproduced track and the corresponding reference signals so as to obtain two difference frequency signal components which respectively have predetermined constant frequencies in any track. A detecting and generating section detects a level difference between the two difference frequency signal components and generates a tracking control signal having a polarity and level which correspond to a tracking error.

12 Claims, 2 Drawing Figures

METHOD AND DEVICE FOR CONTROLLING THE TRACKING

BACKGROUND OF THE INVENTION

The present invention relates to a method and device for controlling the tracking and, more particularly, to an improvement in a VTR or another type of magnetic tape recording/reproducing apparatus wherein tracking of a magnetic head on a track is properly performed in a playback mode in accordance with four pilot signals which have different frequencies and which are recorded, together with information signals, on a tape.

A conventional tracking control system for a magnetic tape recording/reproducing apparatus, especially a VTR, is described under the title "Method of controlling the position of a write or read head and a device for carrying out the method" in U.S. Pat. No. 4,297,733. According to the principle of this method, four tracking signals (pilot signals) having different frequencies are recorded, together with information signals, on sequential tracks in the recording mode. In the playback mode, the pilot signals are used to obtain tracking control signals.

According to the method described above, four pilot signals are provided having four frequencies f1, f2, f3 and f4 which satisfy the following conditions: $|f1-f2|:|f2-f3|:|f3-f4|=1:3:1$ or $3:1:3$. These pilot signals are sequentially recorded on the tracks of a video tape as a record carrier in a cyclic sequence of f1, f2, f3, f4, f1, . . . In the playback mode, four reference signals having frequencies which satisfy the same conditions are provided in the same cyclic sequence as the pilot signals. Two difference frequency signal components are obtained from differences detected between a pilot signal component of an immediately preceding track (adjacent track) to a given reproduced track and a corresponding reference signal and between a pilot signal component of an immediately following track to the given reproduced track and a corresponding reference signal. For example, when the track recorded with a pilot signal of the frequency f2 is subjected to reproduction by the magnetic head, the pilot signals recorded on the right and left adjacent tracks, respectively, have the frequencies f1 and f3, and the corresponding reference signal has the frequency f2. Therefore, the frequencies of the two difference frequency signal components described above are given to be $|f1-f2|$ and $|f2-f3|$, respectively. Similarly, when the recording tracks having the pilot signals of the frequencies f3, f4 and f1 are played back, difference frequency signal components $|f2-f3|$ and $|f3-f4|$, $|f3-f4|$ and $|f4-f1|$, and $|f4-f1|$ and $|f1-f2|$ are obtained, respectively. Now assume that $|f1-f2|=|f3-f4|=M$ and $|f2-f3|=|f4-f1|=3M$. The difference frequency signal components of the frequencies M and 3M are normally obtained when any track is set in the playback mode. These signals are detected from the reproduced signal, and the difference between the levels of these difference frequency signal components is detected so as to obtain a tracking control signal. Tracking control is then performed to compensate for the tracking control signal by means of a tracking servo circuit e.g. those may be zero. Thus, the head can be properly traced on the track in the playback mode.

According to this system, however, a ratio of a difference frequency signal corresponding to the difference between the reference signal and the pilot signal component which is detected from the right adjacent track of the reproduced track to the difference frequency signal corresponding to the difference between the reference signal and the pilot signal component which is detected from the left adjacent track thereof not constant but changes to be 1:3 and 3:1 in every other track. For this reason, when there is a difference between difference frequency signal components of the frequencies M and 3M, the resultant level difference signal is inverted in every other track even if a tracking error occurs in the same direction. Therefore, the inverted and noninverted difference signals must be switched in every other track in order to be extracted as tracking control signals. Thus, tracking noise is mixed in the tracking control signals, and tracking control becomes unstable. In addition, a polarity inverter, a control signal switching circuit and control circuits thereof are required, resulting in a complex circuit arrangement of high cost.

Furthermore, since the difference level signals must be inverted in every other track to obtain the tracking control signal, tracking position adjustment cannot be performed in principle. It is a problem take place depended on the head size and the head mounting position varies in each apparatuses by mass production. In this case, also correction must be performed to achieve proper tracking position adjustment.

SUMMARY OF THE INVENTION

It is an object of the present invention to provide an improved method and device for controlling the tracking wherein a noise component will not be mixed with a tracking control signal and stable tracking control can be performed by a low-cost, simple arrangement.

It is another object of the present invention to provide an improved method and device for controlling the tracking wherein tracking position adjustment can be easily performed.

In order to achieve the above objects of the present invention, there is provided a method and device for controlling the tracking in a playback mode in accordance with at least four pilot signals of different frequencies f1, f2, f3 and f4 which are sequentially recorded together with information signals on tracks of a recording medium in a predetermined cyclic sequence and which satisfy a relationship $|f1-f2|:|f2-f3|:|f3-f4|=A:B:A$, wherein differences between two pilot signal components extracted from two tracks adjacent to both side of a reproduced track of the recording medium and corresponding one of four reference signals which respectively have the same relationship those of the four pilot signal frequencies f1, f2, f3 and f4 and which are supplied in correspondence to reproduced tracks in a different cyclic sequence from that of the four pilot signals are detected as two difference frequency signal components which respectively have predetermined constant frequencies in every track. The difference between levels of the two difference frequency signal components is detected so as to obtain a tracking control signal.

According to the system described above, the two difference frequency signal components between the pilot signal components from the tracks adjacent to the reproduced track and the corresponding reference signals respectively have the predetermined constant frequencies in every track. Therefore, the difference between the two difference frequency signal components obtained with respect to each reproduced track is not subjected to polarity inversion, so that the difference corresponds to the direction of a tracking error. Therefore, the level difference signal need not be inverted in every track and can be used as the tracking control signal. Unstable tracking control caused by switching noise can be prevented. In addition, the polarity inverter, the switching circuit and the control circuits thereof can be eliminated, thereby providing a simple, low-cost arrangement.

DETAILED DESCRIPTION OF THE PREFERRED EMBODIMENT

A method for controlling tracking according to the present invention will now be described. In this method, the cyclic sequence of reference signals supplied in the playback mode differs with specified position relationship from that of pilot signals recorded in the recording mode, and differences between two extracted pilot signal components and the corresponding reference signals are detected as two difference frequency signals which respectively have predetermined constant frequencies in every other track. A level difference signal corresponding to the difference between these difference frequency signals has a magnitude and polarity corresponding to a tracking error.

Figure 1:
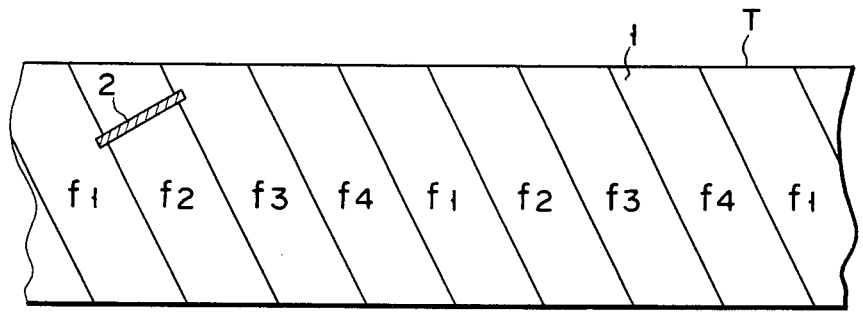
FIG. 1 is a representation for explaining tracking pilot signals of different frequencies which are recorded in a cyclic sequence on tracks of a video tape to which the present invention is applied.

As shown in FIG. 1, the four pilot signals of different frequencies f1, f2, f3 and f4 are sequentially recorded together with information signals on tracks 1 of a record medium T in a cyclic sequence so as to satisfy a relationship $|f1-f2|:|f2-f3|:|f3-f4|=A:B:A$. In the playback mode, differences between two pilot signal components extracted from two tracks adjacent to both side of a track reproduced by a magnetic head 2 and one corresponding reference signals of four reference signals respectively having the same relationship those of the four pilot signal frequencies f1, f2, f3 and f4 and supplied in another predetermined cyclic sequence are respectively detected as two difference frequency signals. In this case, the cyclic sequence of the pilot signals is given to be in an order of f1, f2, f3, f4, f1, . . . , while the cyclic sequence of the reference signals is given to be in an order of f3, f2, f1, f4, f3, . . . (odd-numbered signals are reversed) or f1, f4, f3, f2, f1, . . . (even-numbered signals are reversed). It should be noted that the ratio A:B:A is arbitrarily given.

Assume that $|f1-f2|:|f2-f3|:|f3-f4|=A:B:A$ is given to be 1:3:1. The frequencies f1, f2, f3 and f4 of the pilot signals are given as follows:
f1=N
f2=N+M
f3=N+4M
f4=N+3M
In a VTR, N≈6.5 fH and M≈fH (where fH is the horizontal sync frequency) are given. In this case, the frequencies f1, f2, f3 and f4 are given as follows:
f1≈6.5 fH
f2≈7.5 fH
f3≈10.5 fH
f4≈9.5 fH The following table shows the relationship between the frequencies of various signals and the corresponding track numbers when these pilot signals of the frequencies f1, f2, f3 and f4 are recorded on the tracks of the recording medium T in a cyclic sequence of f1, f2, f3, f4, f1, . . .

| Frequency | Track No. | | | | | |
|---|---|---|---|---|---|---|
| | 1 | 2 | 3 | 4 | 5 | 6 |
| fP0 | N | N+M | N+4M | N+3M | N | N+M |
| fPR | N+M | N+4M | N+3M | N | N+M | N+4M |
| fPL | N+3M | N | N+M | N+4M | N+3M | N |
| fS | N+4M | N+M | N | N+3M | N+4M | N+M |
| fDR | 3M | 3M | 3M | 3M | 3M | 3M |
| fDL | M | M | M | M | M | M |

In the above table, fP0 is the frequency of the pilot signal extracted from the reproduced track, and fPR and FPL are frequencies of the pilot signals reproduced from the right and left tracks adjacent to the reproduced track. In the VTR, the frequencies of the pilot signals fall within a frequency band lower than that of a low-converted color subcarrier. Thus, the pilot signal from the reproduced track and the pilot signals from the right and left tracks adjacent thereto have a high S/N ratio, simultaneously.

On the other hand, fS is the frequency of the reference signal. The cyclic sequence of the reference signals is obtained by reversing the positions of the odd-numbered reference signals and is thus given to be f3 (N+4M), f2 (N+M), f1 (N), f4 (N+3M), f3 (N+4M),. . . unlike the cyclic sequence (of the pilot signals) of f1 (N), f2 (N+M), f3 (N+4M), f4 (N+3M), f1 (N),. . . ; and fDR and fDL are respectively difference frequency signals which have a frequency corresponding to the difference between fPR and fS and between fPL and fS, respectively. In this case, fDR is given to be 3M, and fDL is given to be M. A ratio of fDR to fDL is given to be 3:1 in any track, unlike in the conventional case wherein the ratio is alternately reversed between 3:1 and 1:3. Therefore, a level difference signal between the signals of fDR and fDL constantly has a polarity corresponding to the tracking error.

In the playback mode, a signal of a frequency 4M is obtained from every other track as an (fP0−fS) component corresponding to the difference between the pilot signal from the reproduced track and the reference signal. This signal component can be reduced to a negligible level by a band-pass filter which is used to separate the difference frequency signals of fDR and fDL. In addition, a signal of a frequency 2M is obtained from every other track as a difference frequency signal component corresponding to the difference between adjacent tracks. This signal component can also be reduced in the same manner as described above. In the above description, the ratio A:B:A is given to be 1:3:1. However, this ratio can be arbitrarily selected. For example, the ratio may be 3:1:3, 1:5:1 or 5:1:5. In particular, when the ratio is given to be 1:n:1 or n:1:n, n is preferably an odd number of 3 or more.

Figure 2:
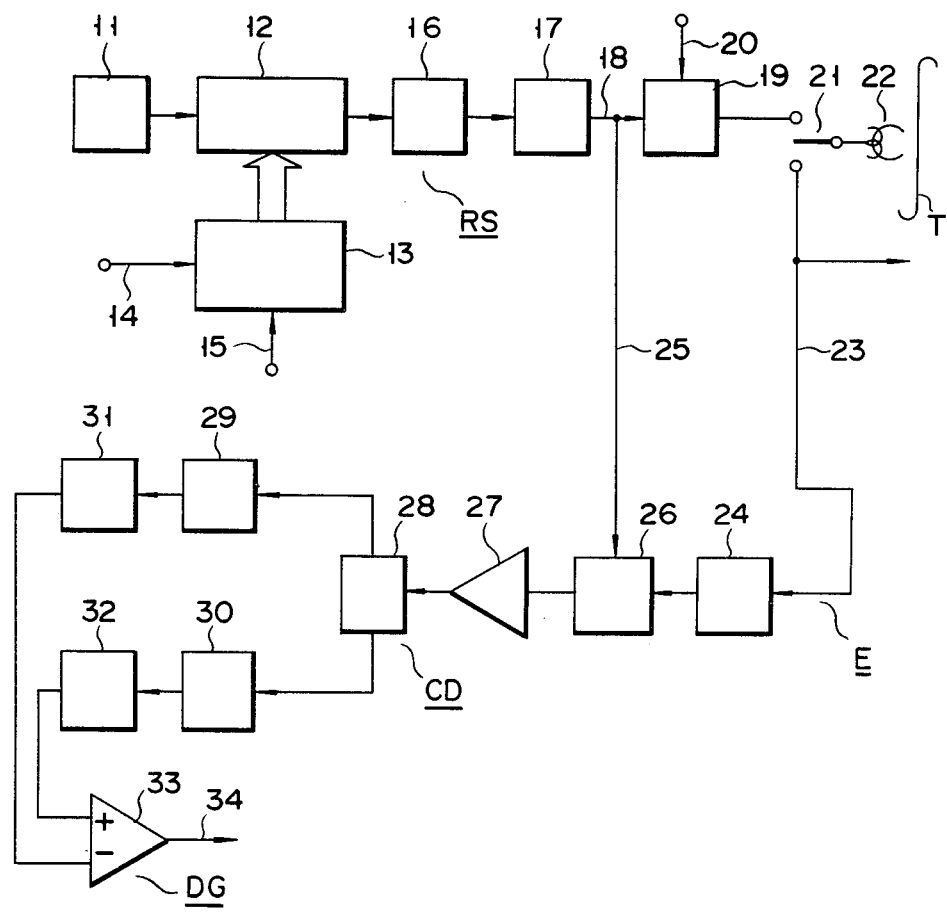
FIG. 2 is a block diagram of a tracking servo circuit according to an embodiment of the present invention.

A device for controlling the tracking according to the present invention will be described hereinafter. FIG. 2 is a tracking control circuit in the case when the present invention is applied to a VTR. Referring to FIG. 2, a reference oscillator (OSC) 11 oscillates at a common multiple of the frequencies f1, f2, f3 and f4 of the pilot signals which satisfy the relationship previously described. An output from the oscillator 11 is supplied to a presettable down counter 12 and is frequency-divided to produce signals of 2f1, 2f2, 2f3 and 2f4 under the control of a control circuit 13. The control circuit 13 is operated in accordance with the recording (REC)/playback (PB) mode. In the REC mode, the control circuit 13 changes the frequency division ratio so as to cause the counter 12 to generate signals of 2f1, 2f2, 2f3, 2f4, 2f1,..., in a cyclic sequence for the tracks.

Outputs from the counter 12 are supplied to a flip-flop (F/F) 16 and are divided to generate 50%-duty signals of frequencies f1, f2, f3 and f4. The 50%-duty signals are supplied to a filter (FIL) 17 which eliminates the high-frequency components of these signals, thereby obtaining pilot signals 18. The pilot signals 18 are mixed with information signals 20 by a mixer (MIX) 19. Composite signals are then supplied to a magnetic head 22 through a switch 21 for switching between the REC and PB modes. Therefore, the pilot signals 18 are recorded on the tracks of the recording medium T, such as a video tape, in a given cyclic sequence, while the pilot signals 18 are superposed on the information signals 20.

In the PB mode, a PB signal reproduced by the head 22 and extracted through the switch 21 is supplied to a low-pass filter (LPF) 24 which constitutes an extraction section E for extracting the pilot signals. The control circuit 13 which constitutes a reference signal supplying section $\overline{RS}$ controls the counter 12 such that reference signals of frequencies 2f3, 2f2, 2f1, 2f4, 2f3,... are generated in accordance with a track switching signal 14 and a REC/PB mode signal 15, so that the filter 17 generates reference signals 25 in the cyclic sequency f3, f2, f1, f4, f3,.... These reference signals 25 are supplied to a mixer 26 which consitutes a comparing and detecting section $\overline{CD}$ and are mixed with the pilot signal components extracted by the low-pass filter 24. The outputs from a mixer (MIX) 26 include necessary two difference signal components 3M and M from the right and left adjacent tracks and unnecessary signal components of 4M and 2M. The components of 4M and 2M are removed by a band-pass filter to be described in detail later. The outputs from the mixer 26 are amplified by an amplifier 27 and are divided by a divider 28 which divides a proper amplitude ratio. The divided signals are respectively supplied to band-pass filters (BPF) 29 and 30. The band-pass filters 29 and 30 respectively have center frequencies of 3M and M and extract the two difference frequency signal components from the right and left tracks adjacent to the reproduced track. The difference frequency signals output from the band-pass filters 29 and 30 are respectively supplied to detectors (DET) 31 and 32 constituting a detecting and generating section $\overline{DG}$. Level detection outputs from the detectors 31 and 32 are respectively supplied to the inverting and noninverting input terminals of a differential amplifier 33. The differential amplifier 33 generates a level difference signal which serves as a tracking control signal 34 having a polarity and level corresponding to the tracking error. In a VTR, the tracking control signal 34 is used for capstan motor (not shown) control for driving a tape or head movement control for moving the rotary head along the track-width direction or the azimuth angle direction. As a result, the head can accurately trace the tracks. In this case, both of the capstan motor control and the head movement control can be used, simultaneously.

The 3M frequency component from the detector 31 corresponds to a tracking error in the right (advance) direction in FIG. 1, while the M frequency component from the detector 32 corresponds to a tracking error in the left (lag) direction in FIG. 1. When the difference between the 3M frequency component as a negative value and the M frequency component as a positive value is calculated by the differential amplifier 33, the tracking error in the right (advance) direction corresponds to the negative polarity of the tracking control signal 34, and the tracking error in the left (lag) direction corresponds to the positive polarity of the tracking control signal 34. In other words, the tracking error in a given direction (right or left) always has the same polarity. Therefore, the tracking control signal need not be inverted in every track. The switching noise will thus not be mixed in the tracking control signal. Unlike in the conventional tracking system, more stable tracking control can therefore be performed.

The division ratio (e.g., weighting coefficients of the 3M and M difference frequency signals by, e.g., a potentiometer system) of the divider 28 can be changed to allow simple tracking position adjustment. In mass production, VTRs do not often have linear but arcuate tracks depended on the head size and the head mounting position varies. In this case, when tracking control is performed such that the head passes substantially at the center of the tracks, the S/N ratio of the PB signal will not be optimized. Instead, a slight tracking error is provided so as to obtain an optimal S/N ratio. In this case, the tracking position adjustment can be also shifted to obtain an optimal S/N ratio, resulting in convenience.

It is difficult to accurately match the center frequencies of the band-pass filters 29 and 30 with the desired values, and thus the outputs from the band-pass filters 29 and 30 are often deviated from the desired values. In this case, the optimal S/N ratio of the PB signal cannot be obtained. However, this problem can be easily solved by adjusting the division ratio of the divider 28.

The pilot signals and the reference signals are obtained from the oscillator 11. However, two oscillators may be included and are selectively used in the REC or PB mode. In this manner, the pilot signals and the reference signals may be generated from different oscillators. In this case, the control circuit for changing the cyclic sequence of the corresponding signals is not necessary.

According to the present invention, there is provided an improved tracking control system wherein noise will not be mixed with the tracking control signal, and therefore stable tracking control can be performed, and tracking position adjustment can also be easily performed.

The present invention is not limited to the particular embodiment described above. Various changes and modifications may be made within the spirit and scope of the present invention.

For example, the reference signals supplied to the mixer 26 need not be a sinusoidal wave. Thus, the output from the flip-flop 16 need not be supplied to the filter 17 but can be directly supplied as the reference signals 25 to the mixer 26.

In addition to this modification, a band-pass filter having a desired center frequency can be used in place of the low-pass filter 24.

What is claimed is:

1. A method for controlling the tracking in a playback mode in accordance with at least four pilot signals of different frequencies f1, f2, f3 and f4 which are recorded together with information signals on sequential tracks of a recording medium in a predetermined cyclic sequence and which satisfy a relationship $|f1-f2|:|f2-f3|:|f3-f4|=A:B:A$, comprising the steps of: detecting, as two difference frequency signal components which respectively have predetermined constant frequencies in every track, differences between two pilot signal components extracted from two tracks adjacent to both side of a reproduced track of the recording medium and corresponding one of four reference signals which respectively have the same relationship those of the four pilot signal frequencies f1, f2, f3 and f4 and which are supplied in corresponds to sequential reproduced tracks in a different cyclic sequence from that of the four pilot signals; and detecting a difference between levels of the two difference frequency signal components so as to obtain a tracking control signal of a polarity and level corresponding to a tracking error.

2. A method according to claim 1, wherein the cyclic sequence of the four reference signals differs with specified position relationship from that of the four pilot signals.

3. A method according to claim 2, wherein the cyclic sequence of the four reference signals is obtained by reversing odd-numbered reference signals of the four reference signals, with respect to the cyclic sequence of the four pilot signals.

4. A method according to claim 2, wherein the cyclic sequence of the four reference signals is obtained by reversing even-numbered reference signals of the four reference signals, with respect to the cyclic sequence of the four pilot signals.

5. A device for controlling the tracking by the method of claim 1 in a playback mode in accordance with at least four pilot signals of different frequencies f1, f2, f3 and f4 which are recorded together with information signals on sequential tracks of a recording medium in a predetermined cyclic sequence and which satisfy the relationship $|f1-f2|:|f2-f3|:|f3-f4|=A:B:A$, comprising:

extracting means (E) for extracting pilot signal components from reproduced signals obtained by playing back the recording medium;

reference signal supplying means (RS) for supplying in corresponds to reproduced tracks the four reference signals which have the same relationship those of the four pilot signal frequencies f1, f2, f3 and f4 and which have a different cyclic sequence from that of the four pilot signals;

comparing and detecting means for comparing the pilot signal components with the four reference signals supplied from said reference signal supplying means and detecting differences between two pilot signals extracted from two tracks adjacent to both side of a reproduced track and corresponding one of the four reference signals to obtain two difference frequency signal components which respectively always have predetermined constant frequencies in every track; and detecting and generating means for detecting a level difference between the two difference frequency signal components and generating a tracking control signal of a polarity and level which correspond to a tracking error.

6. A device according to claim 5, wherein said reference signal supplying means includes a reference oscillator for generating a reference signal having a frequency as a common multiple of the frequencies f1, f2, f3 and f4.

7. A device according to claim 5, wherein said comparing and detecting means weights the difference frequency signal components which can be detected.

8. A device according to claim 5, wherein said comparing and detecting means comprises: a mixer for mixing the extracted pilot signal components and the corresponding reference signals; a divider having a division ratio to divide composite signals into halves so as to provide a predetermined weighting coefficient; and first and second band-pass filters for separating outputs with predetermined frequency characteristics, respectively.

9. A device according to claim 5, wherein said detecting and generating means comprises first and second detectors for detecting levels of the two difference frequency signal components, respectively, and a differential amplifier for detecting a level difference between outputs generated from said first and second detectors.

10. A device according to claim 6, wherein said reference signal supplying means includes a presettable down counter for dividing the output generated from said reference oscillator by a predetermined frequency division ratio and or a control circuit for controlling the predetermined frequency division ratio in accordance with a track switching signal and a recording/playback mode signal.

11. A device according to claim 10, wherein the predetermined frequency division ratio of said presettable down counter is 2:1.

12. A device according to claim 10 wherein said reference signal supplying means further includes a flip-flop for frequency-dividing into halves the output generated from the presettable down counter.

* * * * *